July 6, 1926.

E. M. RUSSELL 1,591,186

PHASE ANGLE INDICATOR

Filed June 7, 1922

INVENTOR
Everett M. Russell
BY
Geo. B. Willcox
ATTORNEY

July 6, 1926. 1,591,186

E. M. RUSSELL

PHASE ANGLE INDICATOR

Filed June 7, 1922 4 Sheets-Sheet 3

INVENTOR
Everett M. Russell
BY
Geo. B. Willcox
ATTORNEY

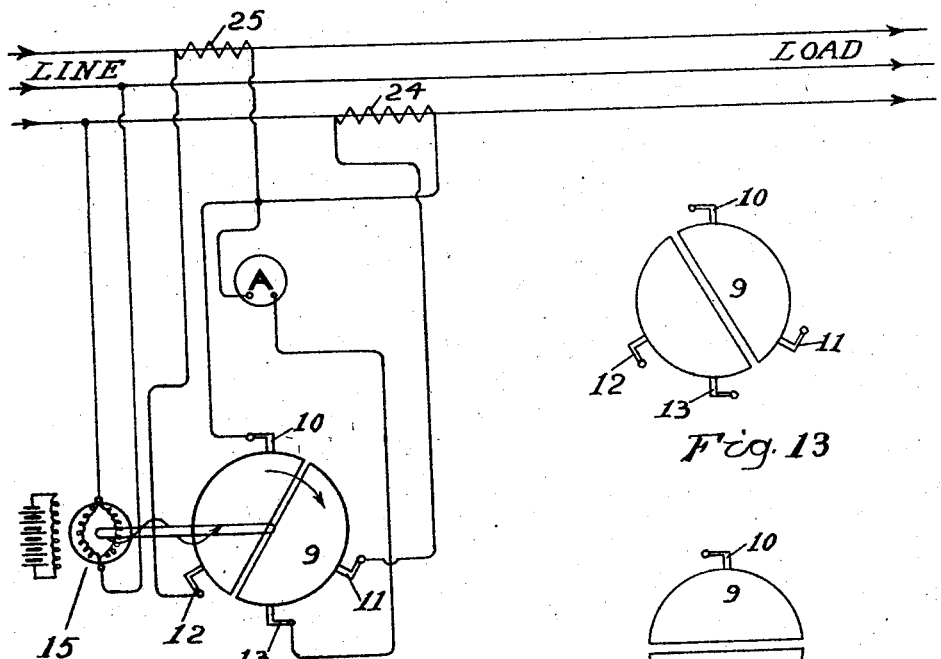
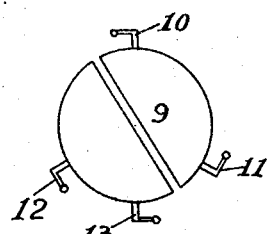
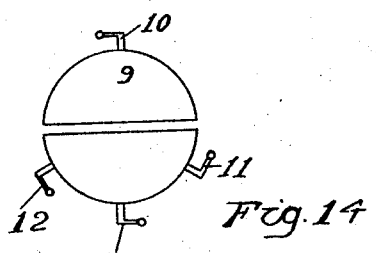
Fig. 12   Fig. 13   Fig. 14
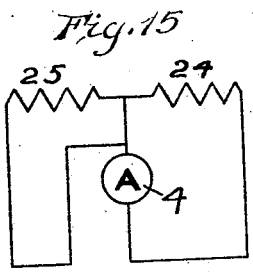
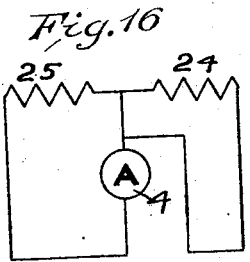
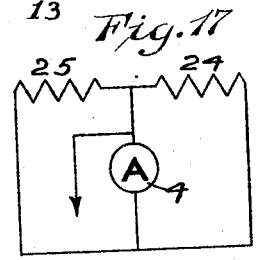
Fig. 15   Fig. 16   Fig. 17
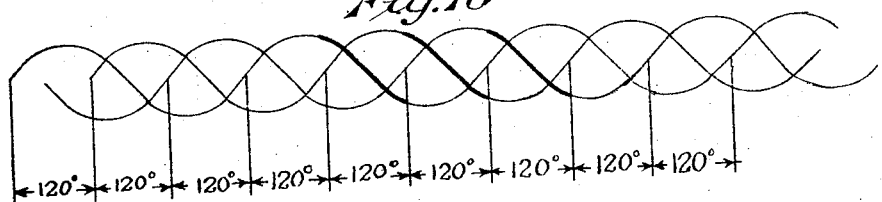
Fig. 10
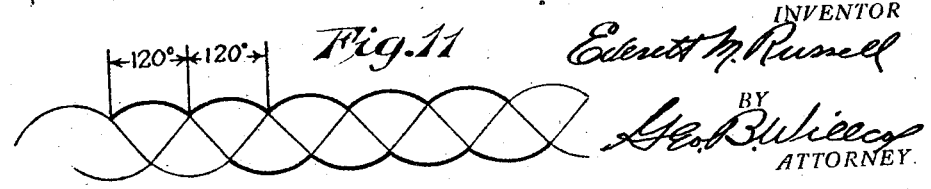
Fig. 11
INVENTOR
Everett M. Russell
BY
Geo. B. Willcox
ATTORNEY Patented July 6, 1926.

1,591,186

UNITED STATES PATENT OFFICE.

EVERETT M. RUSSELL, OF SAGINAW, MICHIGAN, ASSIGNOR OF TWO-SIXTHS TO LESLIE E. MACOMBER AND ONE-SIXTH TO GEORGE B. WILLCOX, BOTH OF SAGINAW, MICHIGAN.

PHASE-ANGLE INDICATOR.

Application filed June 7, 1922. Serial No. 566,673.

This invention relates to devices for making electrical measurements and pertains more particularly to improved means for determining the character and measuring the amount of certain electrical phenomena in circuits carrying alternating current.

For example, one of the applications of my improved instrument is the measurement or determination of the correction factor to be used in ascertaining the actual power in a single phase circuit. The actual power supplied to an alternating current circuit in watts is equal to the effective volts multiplied by the effective amperes times the cosine of the angle by which they differ in phase.

My improved device is adapted to measure accurately the actual angle by which the volts and amperes differ in phase and from this determined angle its cosine may be ascertained from a trigonometric table, the cosine then being employed in the formula: Actual power=E×I×cosine A.

In my invention the correction factor, cosine A, is, as above stated obtained by reading angle A directly from the instrument and determining the cosine from a table. In this respect the method differs from that commonly employed for determining actual power in single phase circuits.

Heretofore it has been customary to read the volts and amperes from a volt-meter and an ammeter respectively, multiplying these two quantities together to get the apparent watts, and then separately to read the watts directly from the line by a wattmeter, then to divide the wattmeter reading by the product of the readings of the ammeter and voltmeter, the result being a decimal correction factor, which by analysis actually represents the cosine of the angle of lag or lead. It is apparent, however, that when the difference in phase is slight, that is, when the angle of lag or lead is a small angle, a considerable difference in the angle may occur without any great difference in the cosine. Therefore, by reading the angle directly from my improved instrument and then finding the decimal corresponding to the cosine of that angle in a trigonometric table, I arrive at the power correction factor much more directly and also more easily and quickly.

A further object of my invention is to provide means for determining with considerable accuracy the power correction factor for a three phase circuit.

With the foregoing and certain other objects in view which will appear later in the specification, my invention comprises the devices described and claimed and the equivalents thereof.

In the drawings, Fig. 1 is a front view of an instrument arranged to indicate the angle, the cosine of which constitutes the true correction factor to be used in determining actual power.

Fig. 10 is a diagrammatic representation of a three phase current, with impulses half negative and half positive.

Fig. 11 is a similar representation with impulses all positive or all negative.

Fig. 12 is a diagram showing the connections for determining power factor in a three phase circuit and showing one position of the split ring.

Figs. 13 and 14 show successive positions of the split ring.

Figs. 15, 16, 17 are diagrams showing the ammeter connections corresponding to the positions of the split ring shown in Figs. 12, 13, 14.

Figure 1:
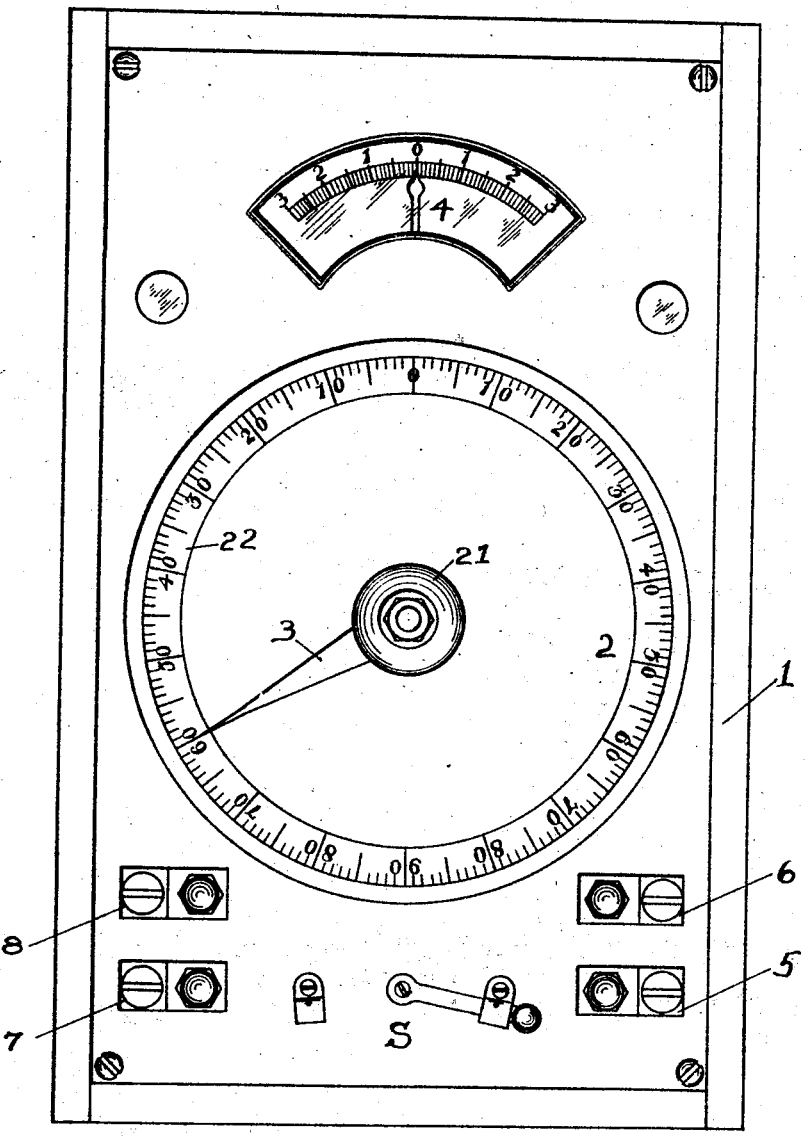

As is clearly shown in the drawings, the instrument consists preferably in a case 1 of any suitable kind, carrying a graduated dial 2 and a pointer 3 and also carrying an indicating ammeter 4 or any equivalent polarity indicator and provided with suitable line connections 5 and 6 and volt-meter connections 7 and 8.

Figure 2:
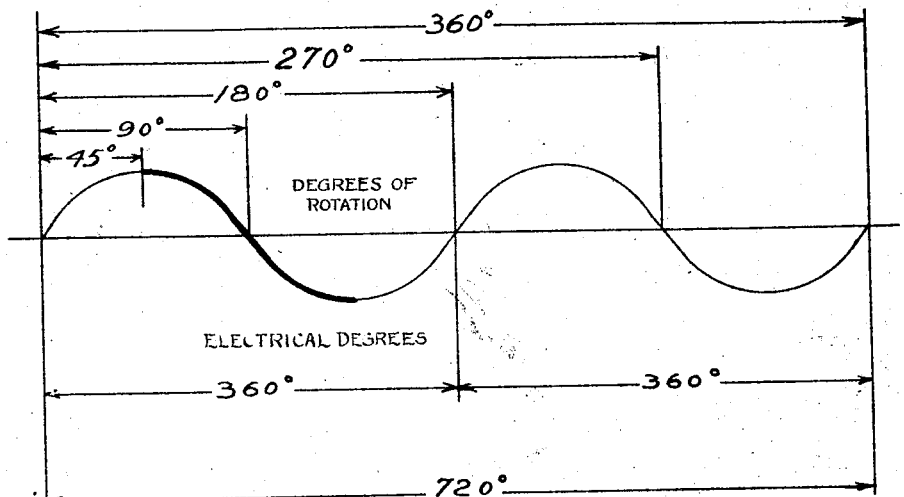
Fig. 2 is a current curve of a single phase circuit.
Figure 3:
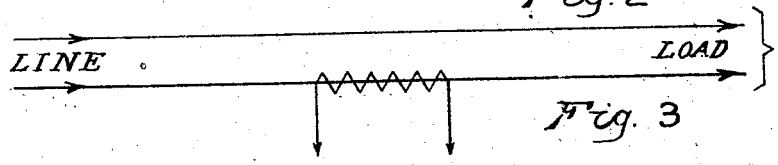
Fig. 3 is a diagram showing the method of connecting the ammeter to the single phase circuit.

Referring to Fig. 2, which represents a typical current diagram, showing two cycles of operation of a single phase current, it will be seen from the dimensions below the base-line representing electrical degrees that the first three hundred and sixty degrees is equally divided into a positive impulse and a negative impulse. From the dimensions above the base-line, which represent degrees of motor rotation in a four pole motor, it will be seen that the first one hundred eighty degrees of actual revolution of the motor results in a positive and a negative impulse of ninety degrees each. If the brushes are arranged in conjunction with a four pole motor and are set so as to take the current during the second half, or forty five degrees, of the first positive impulse and during the first half of the succeeding negative impulse, the total of these two impulses will correspond to a motor rotation of ninety degrees, and since half of the impulse is positive and the other half negative, the resultant reading on a polarity ammeter, such as A in Fig. 3, will be zero. If without moving the brushes there occurs lag or lead in the current with respect to the voltage, then the resultant reading of the ammeter will not be zero and the indicator 4 of the ammeter will show a positive or a negative reading.

It is an important object of my invention to provide means whereby current impulses, such as those indicated by the heavy line in Fig. 2, can be taken at will from the line and transmitted to the indicating ammeter 4, in order that the ammeter may indicate the presence of lag or lead. To this end, I provide as a means for taking the impulses from the line, a split ring 9 Fig. 12, and preferably four brushes, of which one pair, 10 and 11, connects to the indicating ammeter 4 through a current transformer 24 when the split ring is in the position shown in Fig. 12, and another pair 12 and 13, is in like manner adapted to be connected to the line through a transformer 25. To take off the proper current impulses, it is necessary that split ring 9 be revolved in exact synchronism with the current in the line.

As one means for revolving the ring 9 in perfect synchronism with the E. M. F. in the line, the ring 9 may be rotated by means of a synchronous single phase motor 15, which takes the current from the line. Any other suitable means may be employed for revolving the ring 9 in synchronism with the line, but I have found in practice that the synchronous single phase motor 15 answers the purpose satisfactorily.

Figure 4:
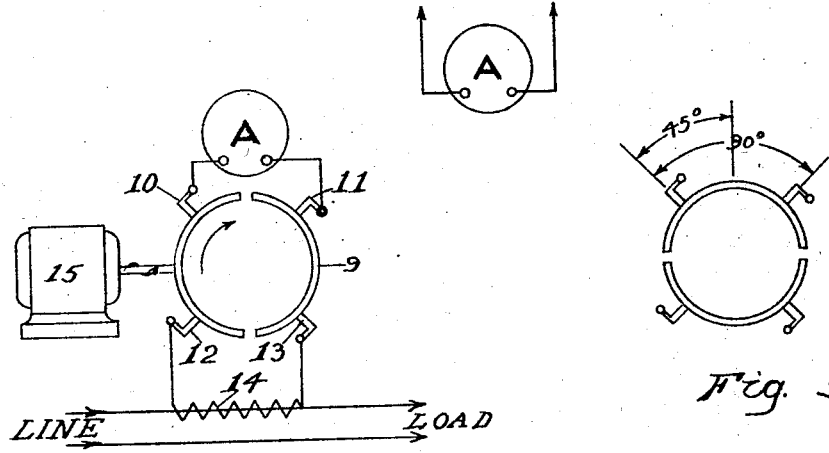
Fig. 4 is a diagrammatic view showing the working relation of the split ring, the synchronous motor, the line and the ammeter.
Figure 5:
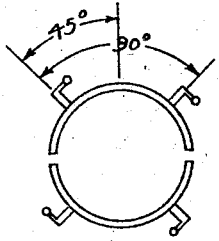
Fig. 5 is a diagrammatic view showing the relative locations of the split ring and its four brushes.

Referring now to Fig. 4, it will be seen that if during the time the split ring is revolving in synchronism with the line, and assuming that the ammeter A reads zero in consequence of having the brushes 10 and 11 so set as to take that part of the impulses represented by the heavy part of the curve in Fig. 2, it is evident that shifting the brushes 10 and 11 by movement of rotation to the right or to the left will result in correspondingly changing the nature of the impulses which are transmitted to the ammeter 4, that is, instead of each impulse being half positive and half negative, as shown by the heavy line in Fig. 2, each impulse may be unequally divided positive and negative and the resultant will be shown as a positive or negative reading of the ammeter 4.

Suppose the impulses to be equally divided positive and negative, and the ammeter reading to be zero, this condition will correspond to no lag and no lead of the current with respect to the voltage.

Now, assume that the current departs in phase from that of the voltage by an amount corresponding to a certain angle of lag or lead, then the resultant impulse will be indicated on the ammeter as a positive or negative reading.

To bring the reading of the ammeter back to zero, the brushes 10, 11, 12, 13 are simultaneously rotated through an angle of adjustment, the amount of which angle depends upon the amount of lag or lead present in the line circuit.

Figure 6:
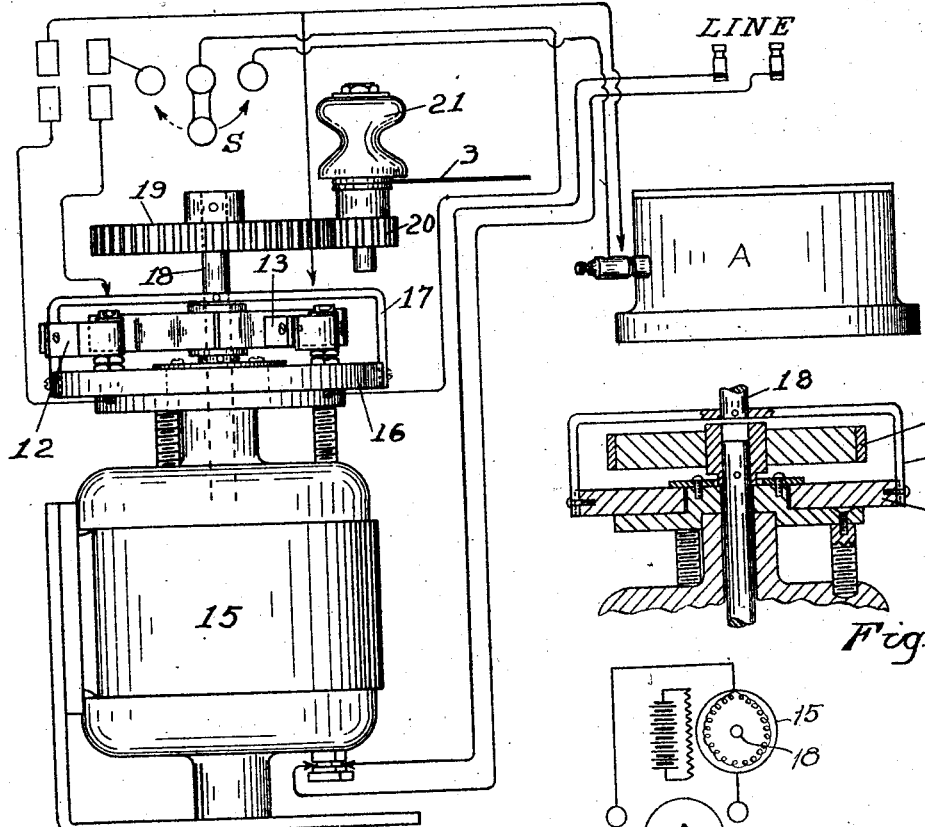
Fig. 6 is a side view of the mechanism contained in the instrument illustrated in Fig. 1, showing the wiring connections diagrammatically.
Figure 7:
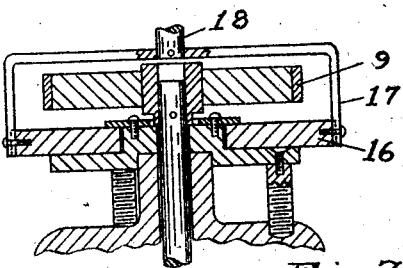
Fig. 7 is a vertical section through the split ring shown in Fig. 6.
Figure 8:
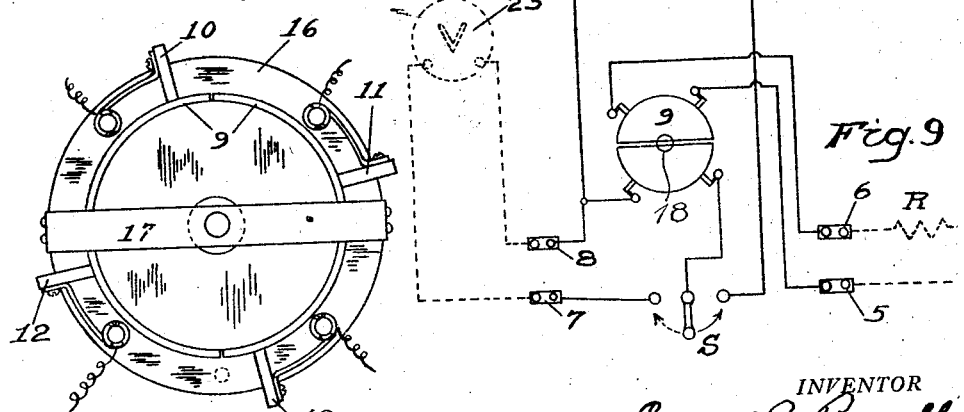
Fig. 8 is a plan view of the split ring and brushes shown in Fig. 6.

To adjust the four brushes through such angles of revolution, I mount them on any suitable revolvable frame or spider, as for example that illustrated in Figs. 6, 7, 8, where 16 is a rotatable brush holder, which may be in the form of a ring upon which the brushes are mounted in the usual manner. The brush holder 16 may be carried by a yoke 17, the yoke secured to a spindle 18 carrying a gear 19 meshing with a pinion 20, the pinion carrying a knob 21 and a pointer 3. Thus by turning the knob 21 and pointer 3 the brush holder 16 may be turned through any desired angle of adjustment, and the amount of that angle will be shown by the movement of the pointer 3 which may travel around a graduated scale 22.

upon which its angles of movement may be read.

While the rotation of brush holder 16 adjusts the brushes so that the reading of ammeter 4 is changed from a positive or negative reading to zero, the pointer 3 will have swung through an arc which can be measured by the graduations of scale 22 and by suitably arranging the scale of these graduations and the ratio of gears 20 and 19, the pointer 3 may be made to read directly in terms of electrical degrees, as shown by the dimensions below the base line in Fig. 2.

It is evident that any part of the graduated scale 22 may be read as readily as any other part and that the angle of movement of pointer 3 necessary to produce zero reading of the ammeter 4 is the actual angle A in the formula: Actual power=E×I×cosine A. Reading the angle through which the pointer has been moved, and referring to a cosine table reveals a decimal which is the correct factor "cosine A" in the formula, and multiplying this decimal by the product of the voltage times the amperes gives the actual power. The decimal itself is known as the power factor.

To read the voltage and the current required for the computation of the above formula, it is necessary to install a volt-meter and ammeter in the line in the usual manner.

My present invention relates to the determination of the power factor which in the formula is, as above stated, cosine A.

In the foregoing description it has been assumed that the zero position of the voltage, that is, the position where the voltage curve crosses the base-line, was in register with the position of the current impulse in order to produce a zero reading of the polarity ammeter 4.

Figure 9:
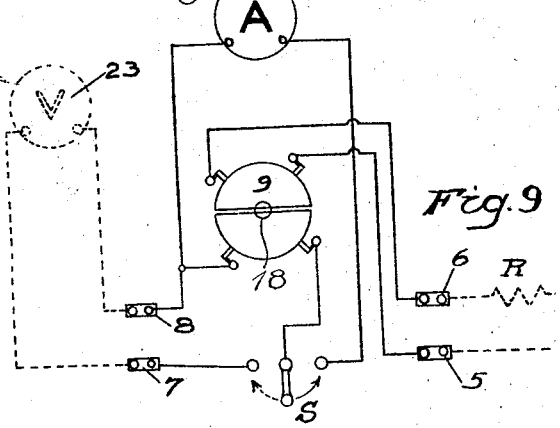
Fig. 9 is a wiring diagram of the instrument arranged for measuring the power correction factor of single phase currents.

In practice, however, it is necessary to actually locate electrically the position of the zero point of voltage with respect to the zero point of current when the two are in register. To locate the zero point of the voltage for purposes of calibration, I temporarily employ a polarity volt-meter 23, connecting it as shown by dotted lines in Fig. 9 and using a volt-meter resistance R. A double throw switch, S, is used to connect the brushes, with either the ammeter or the volt-meter as desired. I adjust the position of the brushes by means of knob 21 so that the volt-meter 23 will read zero and then adjust the pointer 3 so that it will read zero on the graduated scale 22.

The foregoing description relates to the instrument as adapted for the determining of power factor in single phase circuits.

The same instrument may be employed for determination of power factor in polyphase circuits such as three phase, and reference may now be had to the drawings, Figs. 10 and 11, in which Fig. 10 represents diagrammatically a three-phase current, the heavy portions of the curve representing the three successive impulses corresponding to a motor rotation of three hundred sixty electrical degrees.

In Fig. 10 the impulses picked up by the brushes on the split ring are half positive and half negative, as indicated by the heavy lines, and consequently the reading of ammeter 4 for that condition will be zero.

In Fig. 11 the impulses being picked up are either all positive or all negative, depending upon the adjustment of the brushes with relation to the split ring. The same principle of operation applies in the measurement of three phase circuits as was employed in the measurement of single phase circuits. However, the relative positions of the brushes for single phase circuit observations are as indicated in Fig. 4, and for three phase circuits as indicated in Fig. 12.

Referring to Fig. 12, which is a diagrammatic representation of one way of making the connections for determining the power factor of a three phase circuit, 24 and 25 are current transformers applied in two of the three line wires and connected respectively to the brushes 10, 11, and 12, 13. Two of the line wires are connected to single phase synchronous motor 15.

Figs. 12, 13, 14 show the respective positions of split ring 9 with relation to the brushes, at which positions the three current impulses which are indicated by heavy lines in Fig. 10 are taken off by the brushes.

Figs. 15, 16 and 17 are diagrammatic representations respectively of the electrical connections to the ammeter 4 at the times when the split ring 9 is in the positions shown in Figs. 12, 13 and 14.

In Fig. 12, the split ring 9 is in such position that ammeter A is in circuit with current transformer 24 connected to brushes 11 and 13 and current transformer 25 is shorted through brushes 10 and 12.

In the position of split ring 9 shown in Fig. 13 ammeter A is in circuit with transformer 25 through brushes 12 and 13 and current transformer No. 24 is shorted through brushes 10 and 11.

In the ring position shown in Fig. 14 brushes 11, 12 and 13 are shorted and brush 10 is connected in common to transformers 24 and 25. This connection is necessary on an unbalanced three phase load, where the ring 9 is rotated in step with the E. M. F., the ring being driven by a synchronous single phase motor 15 or any equivalent of it.

In operation the method is the same as when measuring power factor of a single phase circuit, that is to say, with the pointer 3 adjusted to read zero when the current is without lag or lead, it will read either positive or negative when lag or lead is present, and by turning the knob 21 and pointer 3 and thereby adjusting the positions of the four brushes on the split ring so as to restore the ammeter to its original zero reading and noting the angular difference between the two positions of the pointer 3, there may be read off from the graduated scale 22 an angle which, referred to the cosine table, produces the required power factor in the form of a decimal.

Having thus described my invention, what I claim and desire to secure by Letters Patent is:

1. In a device for indicating the amount of current lag or lead in a circuit, an impulse-transmitting member revolvable in synchronism with the impulses of the E. M. F. to be measured, a plurality of brushes contacting with said member and rotatable with respect thereto, a polarity indicator in series between certain of said brushes, other of said brushes in series with the circuit, and indicating means operatively connected to said brushes and adapted to indicate angularly adjusted positions of said brushes.

2. In a device for indicating lag or lead in a circuit, a split ring revolvable in synchronism with the E. M. F. to be measured, a revolvable brush holder, a plurality of brushes carried by said holder, an ammeter connected in series between certain of said brushes, other of said brushes connected in series with the circuit, indicating means operatively connected to said revolvable brush holder and adapted to indicate angularly adjusted positions of said brushes.

3. In a device for indicating the amount of current lag or lead in a circuit, a split ring revolvable in synchronism with the impulses of the E. M. F. to be measured, two pairs of brushes contacting with said ring and rotatable with respect thereto, an ammeter in series between the brushes of one pair, the other pair of said brushes in series with the circuit, and an angle-indicating device operatively connected to said brushes and adapted to indicate angularly adjusted positions of said brushes.

4. In a device for indicating lag or lead in an alternating current circuit, a split ring, an alternating current synchronous motor adapted to revolve said ring in synchroism with the impulses of said E. M. F., a revolvable brush holder, brushes on said holder contacting with said ring, an ammeter connected in series between two of said brushes, other two brushes connected in series with the main circuit, and indicating means adapted to indicate angular differences between successive angularly adjusted positions of said brush holder.

5. In a device for indicating the amount of current lag or lead in a circuit, an impulse-transmitting member revolvable in synchronism with the impulse of the E. M. F. to be measured, a plurality of brushes contacting with said member, said member and brushes capable of relative circumferential adjustment, a polarity indicator in series between certain of said brushes, other of said brushes in series with the circuit, and indicating means operatively connected to said brushes, and adapted to indicate the relative angularly adjusted positions of said brushes with respect to said member.

In testimony whereof I affix my signature.

EVERETT M. RUSSELL.